Jan. 24, 1956 E. W. KAISER 2,732,227
WELDED ENCLOSURE FOR EXPANSION JOINT
Filed Feb. 1, 1951
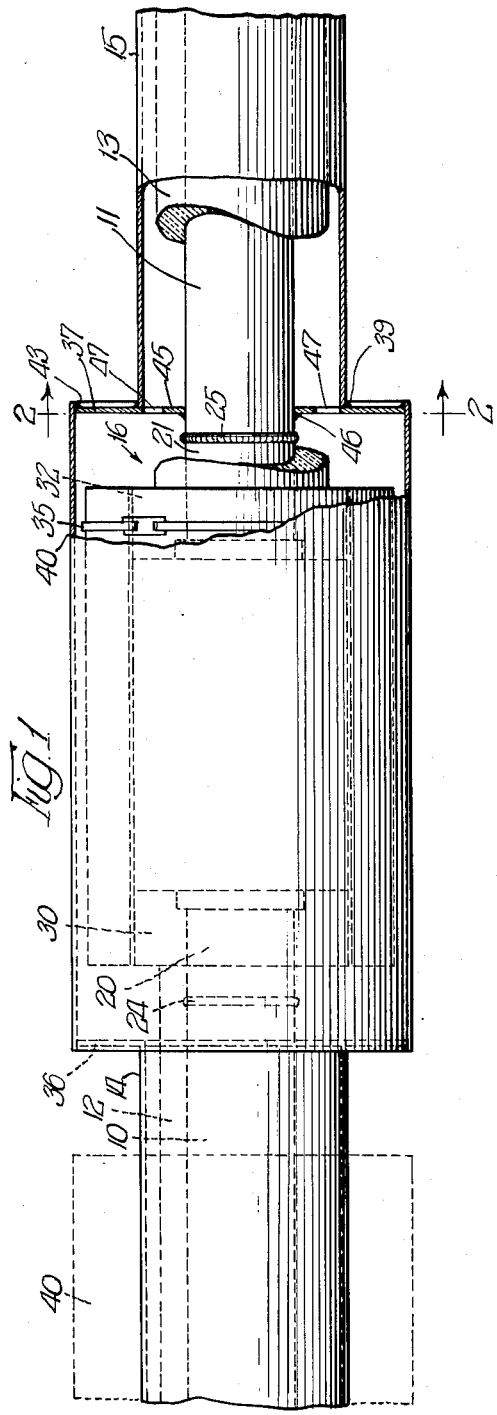
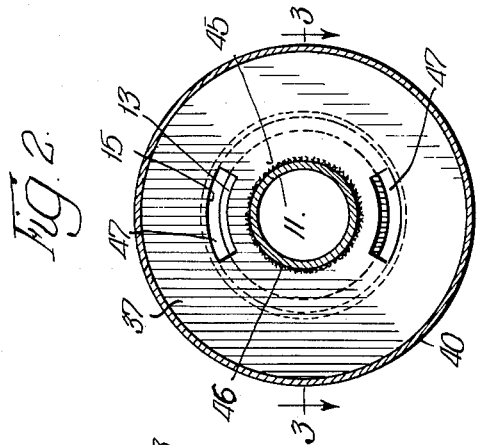
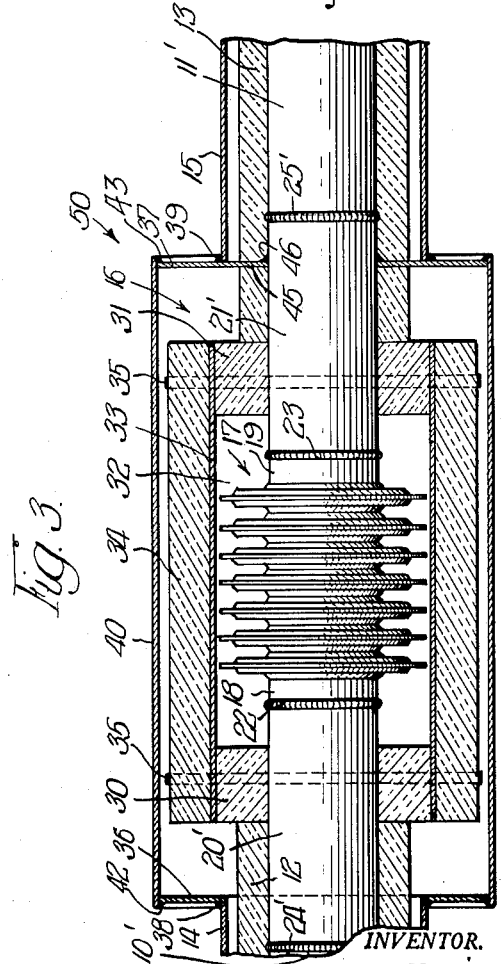
INVENTOR.
Edward W. Kaiser,
BY Robert R. Lockwood
attÿ

United States Patent Office 2,732,227
Patented Jan. 24, 1956

2,732,227
WELDED ENCLOSURE FOR EXPANSION JOINT

Edward W. Kaiser, Chicago, Ill.

Application February 1, 1951, Serial No. 208,922

3 Claims. (Cl. 285—22)

This invention relates, generally, to fluid conducting conduit systems, and it has particular relation to enclosures for expansion joints therein. It can be employed in the conduit system disclosed in application Serial No. 47,851, filed September 4, 1948, now Patent No. 2,658,527, issued November 10, 1953, as a division of application Serial No. 511,366, filed November 22, 1943, now Patent No. 2,570,246, issued October 9, 1951, and it constitutes an improvement over the construction disclosed in application Serial No. 57,225, filed October 29, 1948, now Patent No. 2,650,111, issued August 25, 1953.

As disclosed herein, a bellows type of expansion joint, which interconnects a pair of axially aligned pipes, such as steam pipes, is enclosed in a cylindrical steel casing which extends well past the ends of the expansion joint. At its ends the casing is provided with radially inwardly extending flanges which are secured to the ends of axially aligned housings that surround and are spaced from the pipes. One of the pipes is rigidly connected to the housing in which it is located so that relative movement therebetween at this point is not permitted. The connection between the pipe and the housing may take the form of an extension from one of the flanges. Suitable form sustaining insulation is provided around the pipes and also around the expansion joint. Among the objects of this invention is the improvement of the constructions of housings for expansion joints in conduit systems and related parts. Other objects and advantages of the invention will be apparent as the description proceeds.

For a more complete understanding of the nature and scope of this invention, reference can be had to the following detailed description, taken together with the accompanying drawing, in which:

Figure 1 is a view, partly in side elevation and partly in section, certain parts being broken away, of one embodiment of the invention arranged for field installation and assembly;

Figure 2 is a detail sectional view taken generally along the line 2—2 of Figure 1; and Figure 3 is a detail sectional view taken generally along the line 3—3 of Figure 2 and showing a modification of the construction arranged for prefabrication away from the site of installation and arranged to be transported to the place of installation as a unit and installed as such.

Referring now to the drawing, it will be observed that the reference characters 10 and 11 designate pipes which are arranged to carry fluid such as steam. For illustrative purposes it is pointed out that the pipes 10 and 11, which are axially aligned, may be formed of six inch fourteen gauge steel pipe. These pipes are indicated at 10' and 11' in Figure 3 where a modification of the construction shown in Figure 1 is illustrated. Surrounding these pipes is insulation which is indicated at 12 and 13. The insulation 12 and 13 may be of any suitable character well known in the art. Surrounding the pipes 10 and 11 or 10' and 11' are housings 14 and 15 respectively. It will be noted that the housings 14 and 15 like the pipes which are centrally spaced therein are axially aligned. They may be formed of twelve inch fourteen gauge steel pipe.

Where the pipes 10 and 11 extend for several hundred feet, it is necessary to provide for expansion and contraction thereof resulting from temperature change. For this purpose an expansion joint, shown generally at 16, may be employed. As shown more clearly in Figure 3 the expansion joint 16 may comprise a bellows assembly 17 from the ends of which short lengths of pipe 18 and 19 extend. These short lengths of pipe 18 and 19 are arranged to be connected to pipe sections 20 and 21, Figure 1, or 20' and 21', Figure 3, by suitable arc welding to lay down beads of weld metal 22 and 23. As will appear hereinafter the pipe sections 20' and 21' are slightly longer than the corresponding pipe sections 20 and 21 since the construction shown in Figure 3 is intended to be prefabricated away from the site where the expansion joint 16 is to be used while the construction shown in Figure 1 is arranged to be assembled completely at the site. The outer ends of the pipe sections 20 and 21 or 20' and 21' may be secured to the juxtaposed ends of the pipes 10 and 11 or 10' and 11' by laying down beads of weld metal as indicated at 24 and 25 or 24' and 25'. By the construction thus far described, it will be understood that the pipes 10 and 11 or 10' and 11' are interconnected through the bellows assembly 17 which permits relative movement between the pipes while maintaining them in the necessary fluid tight and pressure tight relationship.

It is desirable to insulate the bellows assembly 17. For this purpose annular sections 30 and 31 of insulation are located around the pipe sections 20 and 21 or 20' and 21' at the ends of the insulation 12 and 13, as shown. The sections 30 and 31 of insulation have sufficient diameter so as to provide ample space 32 within which the bellows assembly 17 is free to expand and contract. Surrounding the annular sections 30 and 31 of insulation is a metallic sleeve 33 which is employed for insuring that an outer sleeve 34 of insulation is maintained in spaced relation to the bellows assembly 17. Steel straps 35 extend around the ends of the sleeves 34 of insulation and hold the same in position.

For the purpose of enclosing the expansion joint 16 in a metallic case annular flanges 36 and 37 are located at the opposed ends of the housings 14 and 15 as shown. They are secured thereto preferably by beads of weld metal 38 and 39. Surrounding the space between the flanges 36 and 37 is a one-piece cylindrical enclosure 40. Preferably it is formed of steel pipe and, for illustrative purposes, it is pointed out that it may be formed of twenty inch ten gauge steel pipe. At its ends the one-piece cylindrical enclosure 40 is secured to the outer peripheries of the flanges 36 and 37 by beads of weld metal as indicated at 42 and 43.

It is desirable that the housing, for example the housing 15, be fastened to the pipe 11 at one point so as to fix this particular point in the pipe where no movement thereof takes place with respect to the housings 14 and 15. This then makes it possible to predetermine the location where the expansion takes place and makes more efficient use of the expansion joint 16. In accordance with the present invention the pipe 11 may be anchored to the housing 15 by means of an anchor extension 45 which constitutes an integral part of the flange 37. As shown in each of the figures of the drawing, the anchor extension 45 extends radially inwardly from the flange 37 and surrounds the pipe 11. The anchor extension 45 may be secured to the pipe 11 by a bead of weld metal which is indicated at 46. It will be understood that the rigid connection between the pipe 11 and the housing 15, provided by the construction just described, insures that there is substantially no relative movement between the pipe 11 and the housing 15 along a line through the anchor extension 45. The housings 14 and 15 and the cylindrical enclosure 40 are of sufficient cross sectional area so that they are able to withstand the tension and compression stresses to which they are subjected as a result of expansion and contraction of the pipes 10 and 11.

With a view to providing for communication between the spaces on opposite sides of the anchor extension 45, ports 47 may be provided therein as shown more clearly in Figure 2. The ports 47 are generally sector shaped and provide flow ways between the spaces on opposite sides of the anchor extension 45.

While the present invention contemplates that the anchor extension 45 shall be located at one end of the one-piece cylindrical enclosure 40, it will be understood that the pipe 11 can be anchored to the housing 15 at a remote point. For example, the anchor construction and arrangement shown in application Serial No. 194,172, filed November 4, 1950, now Patent No. 2,696,835, issued to E. W. Kaiser on December 14, 1954, can be employed.

As indicated hereinbefore, the construction shown in Figure 1 is intended to be assembled at the site. When this is done it will be understood that the pipes 10 and 11 will be located in spaced axially aligned relationship within the respective housings 14 and 15. It will be noted that the opposed ends of the pipes 10 and 11 project slightly beyond the corresponding ends of the housings 14 and 15. Prior to interconnecting the ends of the pipes 10 and 11 the one-piece cylindrical enclosure 40 is positioned, as shown by the broken lines, in telescoped relation over the housing 14. Thereafter the expansion joint 16 is positioned between the pipes 10 and 11 and the beads of weld metal 24 and 25 are laid down. Then the insulation is applied around the expansion joint 16. The flanges 36 and 37 are welded in position and finally the one-piece cylindrical enclosure 40 is moved from the position shown by broken lines to the position shown by full lines in Figure 1. The weld metal 42 and 43 then is laid down to complete the assembly. If the anchor extension 45 is employed in conjunction with the flange 37, the bead of weld metal 46 is laid down around the pipe 11 prior to the application of insulation thereto.

As pointed out hereinbefore, the construction illustrated in Figure 3 is a prefabricated construction and the prefabricated expansion joint is indicated, generally, at 50. In this construction the pipe sections 20' and 21' are longer than the corresponding pipe sections 20 and 21, shown in Figure 1, and are of sufficient length to extend beyond the ends of the one-piece cylindrical enclosure 40. The insulation around the bellows assembly 17 is applied prior to the welding of the one-piece cylindrical enclosure 40 to the flanges 36 and 37. Where the anchor extension 45 is employed, a short length of the insulation 13 also is applied prior to laying down the weld metal at 46. The prefabricated enclosed expansion joint 50 then is handled and installed as a unit. The extensions of the pipe sections 20' and 21' are aligned with the pipes 10' and 11', respectively, from the ends of which the housings 14 and 15 are withdrawn so as to permit the laying down of the beads of weld metal 24' and 25'. Thereafter the insulation is completed and the housings 14 and 15 are moved into engagement with the flanges 36 and 37 after which the beads of weld metal 38 and 39 are laid down to complete the assembly.

Since certain further changes can be made in the foregoing constructions and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. In combination, a pair of endwise spaced relatively coaxially arranged elongated housings, a pipe in and extending through said housings in spaced relation thereto, expansion means interposed in said pipe between said housings, sheet metal annular flanges extending radially outwardly from and welded to the opposed ends of said housings, and sheet metal enclosure means surrounding said expansion means and welded to the outer peripheries of said flanges and capable of transmitting tension and compression stresses between said housings, one only of said sheet metal annular flanges having an integral inwardly projecting flange portion extending to said pipe and rigidly secured thereto and constituting an anchor portion whereby substantially no relative movement between said pipe and the housing associated therewith can take place where they are interconnected by said anchor portion.

2. In combination, a pair of endwise spaced relatively coaxially arranged elongated housings, a pipe in and extending through said housings in spaced relation thereto, expansion means interposed in said pipe between said housings, sheet metal annular flanges extending radially outwardly from the opposed ends of said housings and rigidly secured thereto by welding, and a one-piece cylindrical enclosure surrounding said expansion means and extending over and beyond the peripheries of said annular flanges and rigidly connected thereto by weld metal along the outside of said flanges and the inside of said enclosure, one only of said sheet metal annular flanges having an integral inwardly projecting flange portion extending to said pipe and secured thereto by weld metal and constituting an anchor portion whereby substantially no relative movement between said pipe and the housing associated therewith can take place where they are interconnected by said anchor portion.

3. A prefabricated expansion joint and closure assembly for interconnecting a pair of endwise spaced relatively co-axially arranged elongated housings having pipes in spaced relation therein, comprising, in combination, a cylindrical casing having a diameter greater than the diameter of said housings, expansion means within said casing and spaced from its ends, a pipe projecting from each end of said expansion means beyond the corresponding end of said casing for connection to the corresponding pipes in said housings, and radially extending sheet metal annular flanges at the ends of and welded to said casing, one of said sheet metal annular flanges extending inwardly only sufficiently far to be secured to one of said housings, the other of said sheet metal annular flanges extending to the pipe individual thereto projecting from said expansion means and welded thereto with the intermediate portion of said other flange adapted to be welded to the other of said housings.

References Cited in the file of this patent

UNITED STATES PATENTS

| | | |
|---|---|---|
| 393,121 | Packham | Nov. 20, 1888 |
| 819,986 | Ellis | May 8, 1906 |
| 1,702,066 | Valentine | Feb. 12, 1929 |
| 2,330,966 | Gottwald et al. | Oct. 5, 1943 |
| 2,360,067 | McLeish | Oct. 10, 1944 |
| 2,451,146 | Baker et al. | Oct. 12, 1948 |
| 2,478,552 | Williamson | Aug. 9, 1949 |
| 2,546,533 | Williamson | Mar. 27, 1951 |
| 2,650,111 | Kaiser | Aug. 25, 1953 |